United States Patent
He et al.

(10) Patent No.: US 10,122,565 B2
(45) Date of Patent: *Nov. 6, 2018

(54) DOWNLINK RESOURCE SCHEDULING

(71) Applicant: Intel Corporation, Santa Clara, CA (US)

(72) Inventors: Hong He, Beijing (CN); Jong-Kae Fwu, Sunnyvale, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/277,956

(22) Filed: Sep. 27, 2016

(65) Prior Publication Data
US 2017/0086173 A1    Mar. 23, 2017

Related U.S. Application Data

(63) Continuation of application No. 13/995,468, filed as application No. PCT/US2012/031036 on Mar. 28, 2012, now Pat. No. 9,497,748.
(Continued)

(51) Int. Cl.
*H04L 27/26* (2006.01)
*H04W 72/04* (2009.01)
(Continued)

(52) U.S. Cl.
CPC ......... *H04L 27/2675* (2013.01); *H04B 7/024* (2013.01); *H04B 7/0456* (2013.01);
(Continued)

(58) Field of Classification Search
CPC ....... H04L 1/16; H04L 1/1671; H04L 1/1692; H04L 1/1812; H04L 5/006; H04L 5/0007;
(Continued)

(56) References Cited

U.S. PATENT DOCUMENTS

2010/0246456 A1* 9/2010 Suo .................. H04B 7/2656
370/280
2011/0105050 A1* 5/2011 Khandekar ............ H04L 5/001
455/68

(Continued)

FOREIGN PATENT DOCUMENTS

CN    101795492 A    8/2010
CN    102088776 A    6/2011
(Continued)

OTHER PUBLICATIONS

International Search Report and Written Opinion dated Oct. 29, 2012 from International Application No. PCT/US2012/031036.
(Continued)

*Primary Examiner* — Marsha D. Banks Harold
*Assistant Examiner* — Dharmesh Patel
(74) *Attorney, Agent, or Firm* — Schwabe, Williamson & Wyatt, P.C.

(57) ABSTRACT

Embodiments of the present disclosure describe devices, methods, computer-readable media and systems configurations for downlink resource scheduling in wireless networks. In some embodiments, the scheduling may include multi-subframe cross carrier scheduling utilizing downlink control information. Other embodiments may be described and/or claimed.

16 Claims, 8 Drawing Sheets

Related U.S. Application Data

(60) Provisional application No. 61/556,109, filed on Nov. 4, 2011.

(51) Int. Cl.

| | | |
|---|---|---|
| *H04W 4/70* | (2018.01) | |
| *H04W 76/11* | (2018.01) | |
| *H04W 76/40* | (2018.01) | |
| *H04B 7/024* | (2017.01) | |
| *H04B 7/0456* | (2017.01) | |
| *H04W 4/06* | (2009.01) | |
| *H04W 24/02* | (2009.01) | |
| *H04W 72/08* | (2009.01) | |
| *H04W 52/24* | (2009.01) | |
| *H04J 11/00* | (2006.01) | |
| *H04L 1/18* | (2006.01) | |
| *H04W 56/00* | (2009.01) | |
| *H04L 5/00* | (2006.01) | |
| *H04B 7/06* | (2006.01) | |
| *H04W 72/02* | (2009.01) | |
| *H04W 52/34* | (2009.01) | |
| *H04W 84/14* | (2009.01) | |
| *H04W 88/02* | (2009.01) | |
| *H04W 88/08* | (2009.01) | |
| *H04W 72/12* | (2009.01) | |
| *H04W 4/00* | (2018.01) | |
| *H04J 3/12* | (2006.01) | |
| *H04L 5/14* | (2006.01) | |
| *H04W 52/14* | (2009.01) | |
| *H04W 68/02* | (2009.01) | |
| *H04L 1/00* | (2006.01) | |
| *H04W 76/00* | (2018.01) | |
| *H04W 76/02* | (2009.01) | |

(52) U.S. Cl.
CPC .............. *H04B 7/0626* (2013.01); *H04J 3/12* (2013.01); *H04J 11/00* (2013.01); *H04L 1/0026* (2013.01); *H04L 1/0077* (2013.01); *H04L 1/1812* (2013.01); *H04L 5/0035* (2013.01); *H04L 5/0053* (2013.01); *H04L 5/0055* (2013.01); *H04L 5/0078* (2013.01); *H04L 5/14* (2013.01); *H04L 27/2646* (2013.01); *H04L 27/2662* (2013.01); *H04W 4/005* (2013.01); *H04W 4/06* (2013.01); *H04W 4/70* (2018.02); *H04W 24/02* (2013.01); *H04W 52/146* (2013.01); *H04W 52/242* (2013.01); *H04W 56/0015* (2013.01); *H04W 68/02* (2013.01); *H04W 72/02* (2013.01); *H04W 72/042* (2013.01); *H04W 72/0413* (2013.01); *H04W 72/085* (2013.01); *H04W 76/002* (2013.01); *H04W 76/021* (2013.01); *H04W 76/11* (2018.02); *H04W 76/40* (2018.02); *H04W 52/244* (2013.01); *H04W 52/34* (2013.01); *H04W 72/12* (2013.01); *H04W 84/14* (2013.01); *H04W 88/02* (2013.01); *H04W 88/08* (2013.01)

(58) Field of Classification Search
CPC ... H04L 5/0053; H04L 5/0092; H04L 5/0094; H04W 28/04; H04W 72/04; H04W 72/14; H04W 72/1205; H04W 72/1215; H04W 72/01
See application file for complete search history.

(56) References Cited

U.S. PATENT DOCUMENTS

| | | |
|---|---|---|
| 2011/0176461 A1 | 7/2011 | Astely et al. |
| 2011/0243066 A1* | 10/2011 | Nayeb Nazar .......... H04L 1/007 370/328 |
| 2012/0044890 A1 | 2/2012 | Jen |
| 2013/0003664 A1* | 1/2013 | Frenne .............. H04W 72/1289 370/329 |

FOREIGN PATENT DOCUMENTS

| | | |
|---|---|---|
| CN | 102123524 A | 7/2011 |
| CN | 102158976 A | 8/2011 |
| CN | 102201885 A | 9/2011 |
| EP | 2738965 A2 | 6/2014 |
| KR | 20110058665 A | 6/2011 |
| KR | 20110109812 A | 10/2011 |
| WO | 2011053851 A2 | 5/2011 |
| WO | 2011053857 A1 | 5/2011 |
| WO | 2011053990 A1 | 5/2011 |
| WO | WO 2011053851 A2 * | 5/2011 ............. H04L 5/001 |

OTHER PUBLICATIONS

Notification Concerning Transmittal of International Preliminary Report on Patentability dated May 15, 2014 in International Application No. PCT/US2012/031036.
Office Action dated Mar. 30, 2015 from Russian Patent Application No. 2014117688.
Office Action dated Nov. 25, 2014 from Australian Patent Application No. 2012333239.
Office Action dated Jul. 7, 2015 from Canadian Patent Application No. 2,853,238.
Office Action dated Jun. 16, 2015 from Japanese Patent Application No. 2014-539920.
Extended European Search Report dated Jun. 25, 2015 from European Patent Application No. 12846485.6.
Office Action dated Jun. 5, 2015 from Korean Patent Application No. 2014-7012103.
Final Rejection dated Dec. 3, 2015 from Korean Patent Application No. 2014-7012103.
Office Action dated Feb. 5, 2016 from Korean Patent Application No. 2014-7012103, 10 pages.
Office Action dated Feb. 18, 2016 from Mexican Patent Application No. MX/a/2014/005391, 6 pages.
Office Action dated Jun. 12, 2016 from Chinese Patent Application No. 201280054293.0, 20 pages.
Office Action dated Nov. 20, 2015 from Australian Patent Application No. 2012333239, 4 pages.
Office Action dated May 11, 2016 from Canadian Patent Application No. 2,853,238, 4 pages.
Article 94 dated May 30, 2016 from European Patent Application No. 12846485.6, 5 pages.
Office Action dated Sep. 9, 2016 from Mexican Patent Application No. MX/a/2014/005391, 10 pages.
Office Action dated Oct. 18, 2016 from Japanese Divisional Patent Application No. 2015-235687, 6 pages.
Office Action dated Oct. 31, 2016 from Australian Divisional Application No. 2015261598, 4 pages.
3GPP, "Evolved Universal Terrestrial Radio Access (E-UTRA); Physical layer procedures (Release 10)," 3GPP TS 36.213 V10.3.0 (Sep. 2011), Sep. 27, 2011, Lte Advanced, 122 pages.
3GPP, "Evolved Universal Terrestrial Radio Access (E-UTRA); Physical Channels and Modulation (Release 10)," 3GPP TS 36.211 V10.3.0 (Sep. 2011), Sep. 27, 2011, Lte Advanced, 103 pages.
Itri, "Discussions on UL-DL TDD configurations for inter-band CA," 3GPP TSG-RAN WG1 Meeting #66bis, R1-113371, Oct. 10-14, 2011, Zhuhai, China, See Section 3.
3GPP, "Evolved Universal Terrestrial Radio Access (E-UTRA) and Evolved Universal Terrestrial Radio Access Network (E-UTRAN); Overall description; Stage 2 (Release 10)," 3GPP TS 36.300 v10.3.0, Mar. 2011, See Section 11.

(56) References Cited

OTHER PUBLICATIONS

NTT DOCOMO, "PCFFICH for Cross-Carrier Assignment," 3GPP TSG RAN WG1 Meeting #61, R1-103243, Agenda Item: 6.2.1, May 10-14, 2010, Montreal, Canada, 4 pages.

Potevio, "Consideration on simultaneous tx/rx on different bands with different UL-DL configurations," 3GPP TSG RAN WG1 Meeting #66bis, R1-113024, Agenda Item: 7.2.1.5.1, Oct. 10-14, 2011, Zhuhai, China, 7 pages.

Mediatek Inc., "Cross-carrier scheduling on different TDD configurations," 3GPP TSG-RAN WG1 Meeting #66bis, R1-113048, Agenda Item: 7.2.1.5.2, Oct. 10-14, 2011, Zhuhai, China, 4 pages.

Samsung, "Data scheduling in CA with different TDD UL-DL configurations," 3GPP TSG RAN WG1 #66bis, R1-113082, Oct. 10-14, 2011, Zhuhai, China, 3 pages.

Alcatel-Lucent et al., "Specification impact of Inter-band Carrier aggregation with different TDD UL-DL configurations," 3GPP TSG RAN WG1 Meeting #66bis, R1-113313, Oct. 10-14, 2011, Zhuhai, China, 3 pages.

LG Electronics, "Remaining CA Issues for Cell Activation/Deactivation and CIF," 3GPP TSG RAN WG1 Meeting #63, R1-106107, Agenda Item: 6.2.4, Nov. 15-19, 2010, Jacksonville, USA, 2 pages.

Second Office Action dated Feb. 15, 2017 from Chinese Patent Application No. 201280054293.0, 21 pages.

Examiner's Report dated Mar. 17, 2017 from Canadian Patent Application No. 2,853,238, 3 pages.

Notice of Preliminary Rejection dated Jun. 1, 2017 from Korean Divisional Application No. 2061-7019236, 9 pages.

Office Action dated Nov. 15, 2017 from Malaysian Patent Application No. PI 2014701068, 3 pages.

Third Office Action dated Jun. 27, 2017 from Chinese Patent Application No. 201280054293.0, 7 pages.

Decision to Refuse dated Jun. 13, 2017 from Japanese Divisional Application No. 2015-235687, 6 pages.

Indian Patent Office—Office Action dated Aug. 7, 2018 from Indian Patent Application No. 3078/CHENP/2014 3 pages.

\* cited by examiner

300

| CIF (3-bits) | CA Level | | | |
|---|---|---|---|---|
| | 2 | 3 | 4 | 5 |
| 000 | $CC_0$ | $CC_0$ | $CC_0$ | $CC_0$ |
| 001 | $CC_1$, '0' | $CC_1$, '0' | $CC_1$, '0' | $CC_1$, '0' |
| 010 | $CC_1$, '1' | $CC_1$, '1' | $CC_1$, '1' | $CC_1$, '1' |
| 011 | $CC_1$, '0,1' | $CC_1$, '0,1' | $CC_2$, '0' | $CC_2$, '0' |
| 100 | Reserved | $CC_2$, '0' | $CC_2$, '1' | $CC_2$, '1' |
| 101 | Reserved | $CC_2$, '1' | $CC_3$, '0' | $CC_3$, '0' |
| 110 | Reserved | $CC_2$, '0,1' | $CC_3$, '1' | $CC_3$, '1' |
| 111 | Reserved | Reserved | Reserved | $CC_4$, '0' |

| CIF (3-bits) | CA Level | | | |
|---|---|---|---|---|
| | 2 | 3 | 4 | 5 |
| 000 | $CC_0$ | $CC_0$ | $CC_0$ | $CC_0$ |
| 001 | $CC_1$, '0' | $CC_1$, '0' | $CC_1$, '0' | $CC_1$, '0' |
| 010 | $CC_1$, '1' | $CC_1$, '1' | $CC_1$, '1' | $CC_1$, '1' |
| 011 | $CC_1$, '0,1' | $CC_1$, '0,1' | $CC_1$, '0,1' | $CC_1$, '0,1' |
| 100 | Reserved | $CC_2$, '0' | $CC_2$, '0' | $CC_2$, '0' |
| 101 | Reserved | $CC_2$, '1' | $CC_2$, '1' | $CC_2$, '1' |
| 110 | Reserved | $CC_2$, '0,1' | $CC_3$, '0' | $CC_3$, '0' |
| 111 | Reserved | Reserved | $CC_3$, '1' | $CC_4$, '0' |

408

| CIF (3-bits) | CA Level | | | |
|---|---|---|---|---|
| | 2 | 3 | 4 | 5 |
| 000 | $CC_0$ | $CC_0$ | $CC_0$ | $CC_0$ |
| 001 | $CC_1$, '0' | $CC_1$, '0' | $CC_1$, '0' | $CC_1$, '0' |
| 010 | $CC_1$, '1' | $CC_1$, '1' | $CC_1$, '1' | $CC_1$, '1' |
| 011 | $CC_1$, '0,1' | $CC_1$, '0,1' | $CC_1$, '0,1' | $CC_1$, '0,1' |
| 100 | Reserved | $CC_2$, '0' | $CC_2$, '0' | $CC_2$, '0' |
| 101 | Reserved | $CC_2$, '1' | $CC_2$, '1' | $CC_2$, '1' |
| 110 | Reserved | $CC_2$, '0,1' | $CC_2$, '0,1' | $CC_3$, '0' |
| 111 | Reserved | Reserved | $CC_3$, '0' | $CC_4$, '0' |

Figure 4

DOWNLINK RESOURCE SCHEDULING

CROSS REFERENCE TO RELATED APPLICATIONS

The present application is a continuation of U.S. patent application Ser. No. 13/995,468, filed Jun. 18, 2013, entitled "DOWNLINK RESOURCE SCHEDULING," which is national phase entry under 35 U.S.C. § 371 of International Application No. PCT/US2012/031036, filed Mar. 28, 2012, entitled "DOWNLINK RESOURCE SCHEDULING", which designates the United States of America, and which claims priority to U.S. Provisional Patent Application No. 61/556,109, filed Nov. 4, 2011, entitled "ADVANCED WIRELESS COMMUNICATION SYSTEMS AND TECHNIQUES," the entire contents and disclosures of which are hereby incorporated by reference in their entireties.

FIELD

Embodiments of the present invention relate generally to the field of communications, and more particularly, to downlink resource scheduling in wireless communication networks.

BACKGROUND

In $3^{rd}$ Generation Partnership Project (3GPP) long-term evolution (LTE) Release 10 (March 2011), which may also be referred to as LTE-Advanced (LTE-A), heterogeneous networks (HetNets) are relied upon to provide high-throughput communications. HetNets may include cells of different power class, e.g., macro, pico, or femto, and access class, e.g., open or closed-subscriber group (CSG). To accommodate for lack of intercell interference coordination (ICIC) control signaling in 3GPP LTE Release 8 (September 2009), multicarrier operation with cross-carrier scheduling was provided. This would allow for the control information applicable to a subframe of a first component carrier, being transmitted in the corresponding subframe of another component carrier that was deemed more reliable. A single subframe cross-carrier scheduling operation is facilitated by use of a carrier identification field (CIF) of UE dedicated downlink control information (DCI) to provide improved control reliability and enable enhanced ICIC (eICIC) for HetNets.

In 3GPP LTE Release 11, each component carrier may have its own time-division duplexing (TDD) uplink-downlink (UL-DL) configuration. However, aggregation of carriers with different TDD UL-DL configurations may complicate cross-carrier scheduling.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 3 illustrates a multi-subframe cross carrier scheduling (MSCC) table in accordance with various embodiments.

FIG. 4 illustrates MSCC tables in accordance with various embodiments.

DETAILED DESCRIPTION

Illustrative embodiments of the present disclosure include, but are not limited to, methods, systems, and apparatuses for downlink resource scheduling in wireless networks.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B". The phrase "at least one of A, B and C" means (A), (B), (C), (A and B), (A and C), (B and C) or (A, B and C). The phrase "(A) B" means (B) or (A and B), that is, A is optional.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
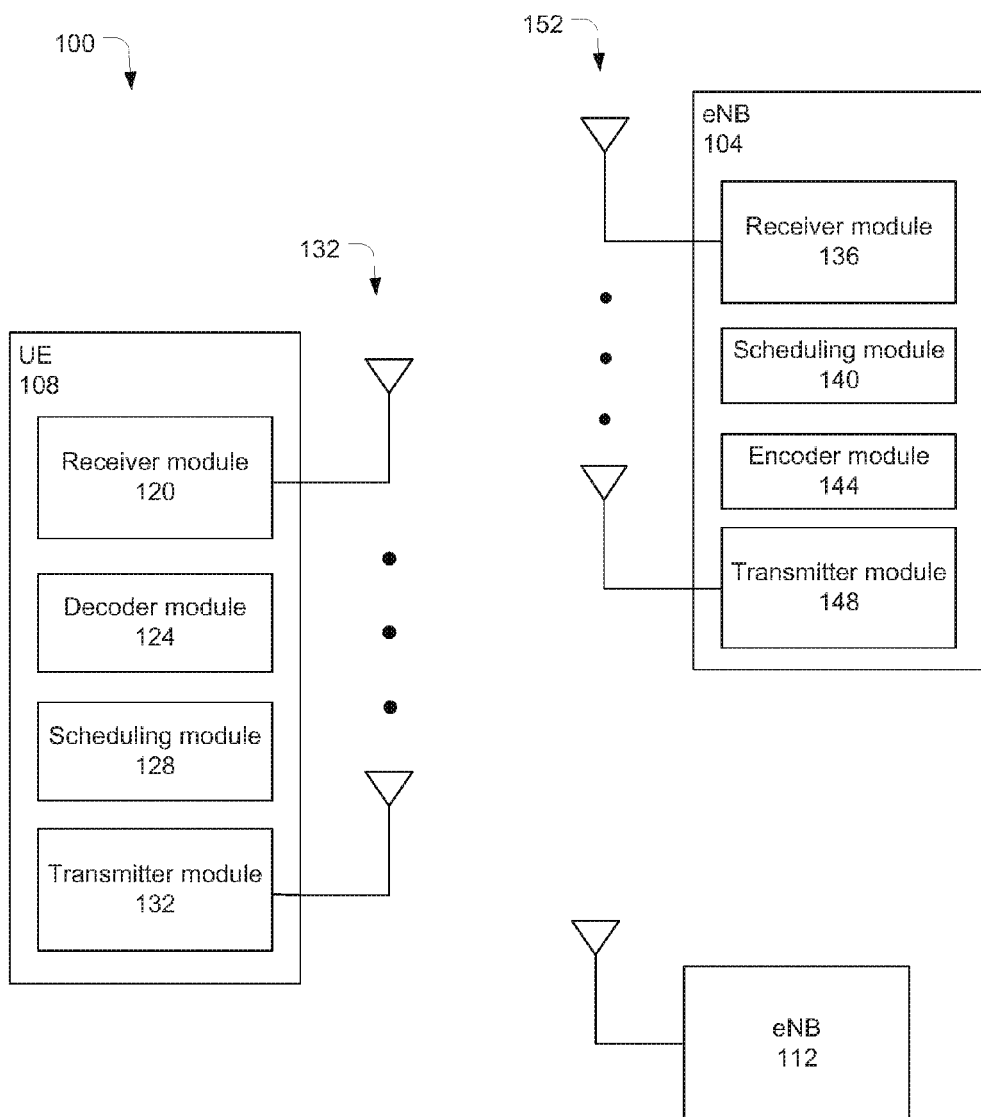
FIG. 1 schematically illustrates a wireless communication network in accordance with various embodiments.

FIG. 1 schematically illustrates a wireless communication network 100 in accordance with various embodiments.

Wireless communication network 100 (hereinafter "network 100") may be an access network of a 3rd Generation Partnership Project (3GPP) long-term evolution advanced (LTE-A) network such as evolved universal mobile telecommunication system (UMTS) terrestrial radio access network (E-UTRAN). The network 100 may include a base station, e.g., enhanced node base station (eNB) 104, configured to wirelessly communicate with a mobile terminal, e.g., user equipment (UE) 108. While embodiments of the present invention are described with reference to an LTE-A network, some embodiments may be used with other types of wireless access networks.

In embodiments in which the UE 108 is capable of utilizing carrier aggregation (CA), a number of component carriers (CCs) may be aggregated for communication between the eNB 104 and the UE 108. In an initial connection establishment, the UE 108 may connect with a primary serving cell (Pcell) of the eNB 104 utilizing a primary CC, which may also be referred to as CC_0. This connection may be used for various functions such as security, mobility, configuration, etc. Subsequently, the UE 108 may connect with one or more secondary serving cells (Scells) of the eNB 104 utilizing one or more secondary CCs. These connections may be used to provide additional radio resources.

In some embodiments, one or more additional eNBs, e.g., eNB 112, may be employed, e.g., in a HetNet configuration. In some embodiments, the eNBs of a HetNet may each have different power and/or access classes. For example, in one embodiment the eNB 104 may be a relatively high-power base station such as a macro eNB, while the eNB 112 may be a relatively low-power base station, e.g., a pico eNB and/or femto eNB.

eNB 112 may have a Pcell and one or more Scell(s) similar to eNB 104. However, the same CCs will not be used for Pcells for the two base stations of the HetNet. For example, if the eNB 104 has CC_0 for its Pcell and CC_1 for its Scell, eNB 112 may have CC_1 for its Pcell and CC_0 for its Scell.

The UE 108 may include a receiver module 120, a decoder module 124, a scheduling module 128, and a transmitter module 132 coupled with one another at least as shown. In some embodiments, the decoder module 124 and/or scheduling module 128 may be incorporated into the receiver module 120. Briefly, the decoder module 124 may operate to decode downlink transmissions received via the Pcell or the Scell, while the scheduling module may operate to identify transmissions, within the downlink, that are scheduled for the UE 108. The receiver module 120 and transmitter module 132 may each be further coupled with one or more of a plurality of antennas 132 of the UE 108.

The UE 108 may include any number of suitable antennas. In various embodiments, the UE 108 may include at least as many antennas as a number of simultaneous spatial layers or streams received by the UE 108 from the eNBs, although the scope of the present disclosure may not be limited in this respect. The number of simultaneous spatial layers or streams may also be referred to as transmission rank, or simply rank.

One or more of the antennas 132 may be alternately used as transmit or receive antennas. Alternatively, or additionally, one or more of the antennas 132 may be dedicated receive antennas or dedicated transmit antennas.

eNB 104 may include receiver module 136, scheduling module 140, encoder module 144, and transmitter module 148 coupled with one another at least as shown. In some embodiments, scheduling module 140 and/or encoder module 144 may be incorporated into the transmitter module 148. Receiver module 136 and transmitter module 148 may each be further coupled with one or more of a plurality of antennas 152 of the eNB 104. The eNB 104 may include any number of suitable antennas. In various embodiments, the eNB 104 may include at least as many antennas as a number of simultaneous transmission streams transmitted to the UE 108, although the scope of the present disclosure may not be limited in this respect. One or more of the antennas 152 may be alternately used as transmit or receive antennas. Alternatively, or additionally, one or more of the antennas 152 may be dedicated receive antennas or dedicated transmit antennas.

Though not shown explicitly, the eNB 112 may include modules/components similar to those of the eNB 104.

With cross-carrier scheduling of a physical downlink shared channel (PDSCH), downlink control information (DCI) transmitted in the Pcell may provide downlink grant information pertaining to the Pcell or one of the Scells. The downlink grant information may be an indication of a downlink resource of the PDSCH that is to include data directed to the UE 108 through the corresponding serving cell. The DCI may include a carrier indication field (CIF) whose value indicates to which serving cell the downlink grant information pertains.

Conventionally, cross-carrier scheduling is restricted to downlink grant information being only applicable to subframes in which the DCI is transmitted. For example, DCI transmitted in subframe 1 would apply only to subframe 1, though it could be any serving cell.

Various embodiments provide for multi-subframe cross-carrier (MSCC) scheduling on PDSCH. This may allow for DCI transmitted in a first subframe of the Pcell, to be applicable to a second subframe in one of the Scells that occurs later in the frame sequence than the first subframe. The MSCC described herein may even be used with CCs having different TDD UL/DL configuration. In some embodiments, this MSCC scheduling may be supported without increasing the DCI overhead to avoid DCI detection performance degradation. This may be done, in part through provision of predetermined subframe pairings as will be described.

MSCC scheduling may include predetermined subframe pairings (x, y) in each half radio frame. The pairings may include a first pairing (0, 3) and a second pairing (1, 4). These particular pairings may provide equal processing latency between the paired subframes. However, other embodiments may include other pairings.

Generally, the predetermined subframe pairings may provide the option of DCI, and DL grant information within the DCI, in particular, transmitted in x subframe of the Pcell, identifying a downlink resource in the y subframe of the Scell. In some embodiments, the subframe pairing may only be implemented in the event that specific TDD UL/DL configurations of the CCs prevent transmission of DL grant information according to the conventional mechanism, i.e., transmitting DL grant information for the Scell in the same subframe of the Pcell.

Embodiments provide that if the Pcell subframe y is a DL subframe, then the DCI for subframe y will be transmitted at Pcell subframe y. However, if the Pcell subframe y is an UL subframe, thereby preventing transmission of DL grant information, then the DCI for subframe y of the Scell will be transmitted at Pcell subframe x. This may be seen with reference to scenarios depicted in FIGS. 2(*a*)-2(*c*).

FIG. 2(*a*) illustrates a scenario in which a Pcell has a TDD configuration 0 with subframe 0 being a downlink subframe (D), subframe 1 being a special subframe (S), and subframes 2-4 being uplink subframes (U). The TDD configurations may be defined by table 1 below.

TABLE 1

| TDD configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

The special subframe may include three fields: downlink pilot time slot (DwPTS), which may include the DCI, guard period (GP), and uplink pilot time slot (UpPTS).

Figure 2A:
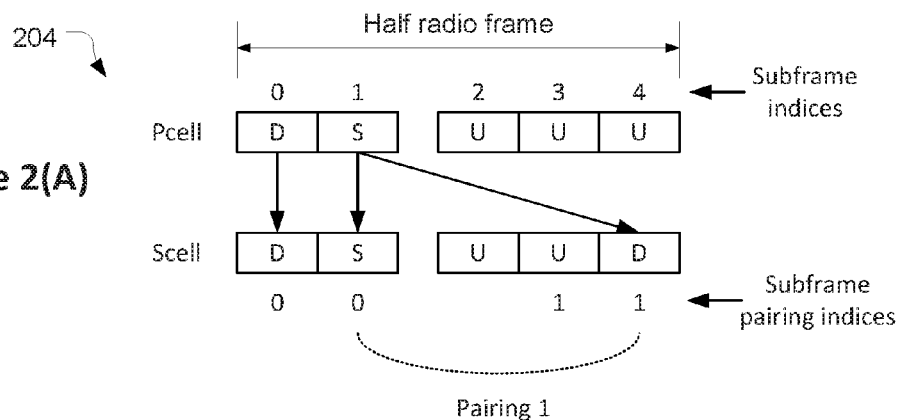
FIGS. 2(A)-2(C) schematically illustrate scheduling scenarios in accordance with various embodiments.

The Scell of FIG. 2(a) has a TDD configuration 1 with subframes 0 and 4 being downlink subframes, subframe 1 being a special subframe, and subframes 2 and 3 being uplink subframes.

In some embodiments, subframe 0 of the Pcell may include DCI that identifies a downlink resource in subframe 0 of the Scell. It may be noted that subframe pairing with respect to (0, 3) is not required given that the 3$^{rd}$ subframe of the Scell is an uplink subframe and, therefore, will not need DL grant information.

Subframe 1 of the Pcell may include DCI that identifies a downlink resource in subframe 1 of the Scell and/or subframe 4 of the Scell. Subframe pairing (1, 4) may be implemented, in this case, because the subframe y of the Pcell, i.e., subframe 4, is an uplink subframe.

Figure 2B:
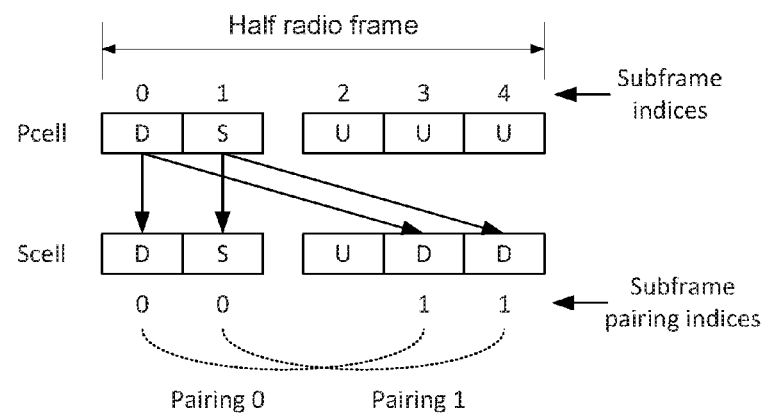

FIG. 2(b) illustrates a scenario in which a Pcell has a TDD configuration 0 with subframe 0 being a downlink subframe, subframe 1 being a special subframe, and subframes 2-4 being uplink subframes. The Scell has a TDD configuration 2 with subframes 0, 3, and 4 being downlink subframes, subframe 2 being a special subframe, and subframe 2 being an uplink subframe.

Subframe 0 of the Pcell may include DCI that identifies a downlink resource in subframe 0 and/or subframe 3 of the Scell. The subframe pairing (0, 3) may be implemented in this case because the subframe y of the Pcell, i.e., subframe 3, is an uplink subframe. Unlike the scenario of FIG. 2(a), subframe 3 of the Scell is a downlink subframe and may therefore receive a DL grant.

Subframe 1 of the Pcell may include DCI that identifies a downlink resource in subframe 1 and/or subframe 4 of the Scell. The subframe pairing (1, 4) may be implemented in this case because the subframe y of the Pcell, i.e., subframe 4, is an uplink subframe.

Figure 2C:
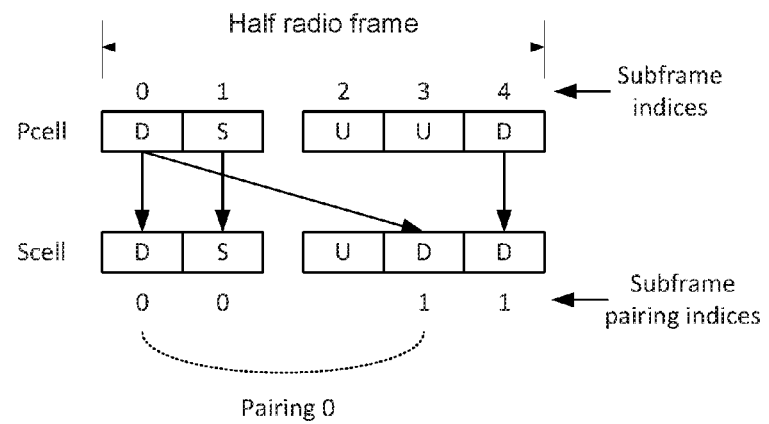

FIG. 2(c) illustrates a scenario in which a Pcell has a TDD configuration 1 with subframes 0 and 4 being downlink subframes, subframe 1 being a special subframe, and subframes 2 and 3 being uplink subframes. The Scell has a TDD configuration 2 with subframes 0, 3, and 4 being downlink subframes, subframe 2 being a special subframe, and subframe 2 being an uplink subframe.

Subframe 0 of the Pcell may include DCI that identifies a downlink resource in subframe 0 and/or subframe 3 of the Scell. The subframe pairing (0, 3) may be implemented in this case because the subframe y of the Pcell, i.e., subframe 3, is an uplink subframe and subframe 3 of the Scell is a downlink subframe.

Subframe 1 of the Pcell may include DCI that identifies a downlink resource in subframe 1. The subframe pairing (1, 4) may not be implemented in this case because the subframe y of the Pcell, i.e., subframe 4, is a downlink subframe. Therefore, subframe 4 of the Pcell may include DCI for subframe 4 of the Scell.

MSCC scheduling may be facilitated by use of MSCC table 300 shown in FIG. 3 in accordance with some embodiments. MSCC table 300 may include mapping information for individual combinations of 3-bit CIF values and carrier aggregation levels as shown. The carrier aggregation level may refer to how many CCs, or serving cells, are configured for communication between the eNB 104 and the UE 108. The values within MSCC table 300 include designated CC, e.g., CC_0, CC_1, CC_2, or CC_3, and subframe pairing index, e.g., 0 and/or 1.

If DCI includes a CIF value of '000,' the DCI information may pertain to the Pcell, i.e., CC_0. If DCI includes a CIF value of '001,' the DCI information may pertain to the first subframe of the subframe pair of the Scell, CC_1. For example, with reference to FIG. 2(b), if DCI was transmitted in subframe 0 of the Pcell and included a CIF value of '001,' then the downlink grant information would identify a downlink resource in subframe 0 of the Scell. If the DCI was transmitted in subframe 1 of the Pcell and included the same CIF value, then the downlink grant information would identify a downlink resource in subframe 1 of the Scell.

If DCI includes a CIF value of '010,' the DCI information may pertain to the second subframe of the subframe pair of the Scell, CC_1. For example, with reference to FIG. 2(b), if DCI was transmitted in subframe 0 of the Pcell and included a CIF value of '010,' then the downlink grant information would identify a downlink resource in subframe 3 of the Scell. If the DCI was transmitted in subframe 1 of the Pcell and included the same CIF value, then the downlink grant information would identify a downlink resource in subframe 4 of the Scell.

If DCI includes a CIF value of '011' and the CA level is either two or three, the DCI information may pertain to the first and second subframes of the subframe pair of the Scell, CC_1. For example, with reference to FIG. 2(b), if DCI transmitted in subframe 0 of the Pcell and included a CIF value of '011,' then the downlink grant information would identify a downlink resource in both subframes 0 and 3 of the Scell.

If DCI includes a CIF value of '011' and the CA level is either four or five, the DCI information may pertain to the first subframe of the subframe pair of a second Scell, CC_2. The remaining mapping information may be interpreted in similar manners.

The CIF in MSCC table 300 is provided as a 3-bit value in order to be compatible with existing 3-bit CIF fields of DCI in LTE REL 10. While the eight states provided by the 3-bit value may not be enough to include every possible combination of CC/subframe index, it may be sufficient to account for the majority of desired scheduling operations.

In some embodiments, CIF may be represented by more or less than 3 bits. In the event that CIF is represented by more than 3 bits, trade-offs between DCI decoding efficiency and increased MSCC scheduling represented by additional CIF states may be considered.

The values selected to be included in a particular table may reflect a particular Scell priority scheme. In general, the tables may reflect a bias toward lower-level Scells based on an assumption that the eNB 104 will likely schedule PDSCH of the lowest Scells first. This may be due to some deployment scenarios utilizing a lower frequency band for the first Scell than for the subsequent Scells. However, different Scell priority schemes may prioritize different Scells in different manners.

Tables 404 and 408 of FIG. 4 reflect various Scell priority schemes, which illustrate some of the flexibility that may be incorporated into the design of tables used in various embodiments.

Table 404 provides an Scell priority scheme in which the first Scell, CC_1, is prioritized. Therefore, each possible subframe pairing index, e.g., '0', '1', and '0,1', is provided for each CA level. If the CA level is four or greater, then the dual subframe scheduling, i.e., scheduling both subframes of the pair, is not supported for the higher CCs, e.g., CC_2, CC_3 and CC_4. Furthermore, when the CA level is five, the scheduling of the second value of the subframe pair is not supported for either CC_3 or CC_4.

Table 408 provides an Scell priority scheme in which first and second Scells are prioritized if the CA level is four or greater. If the CA level is four, then only the first value of the subframe pair is supported for CC_3. If the CA level is five, then only the first value of the subframe pair is supported for CC_3 and CC_4, and the dual subframe scheduling is not supported for CC_2.

Figure 5:
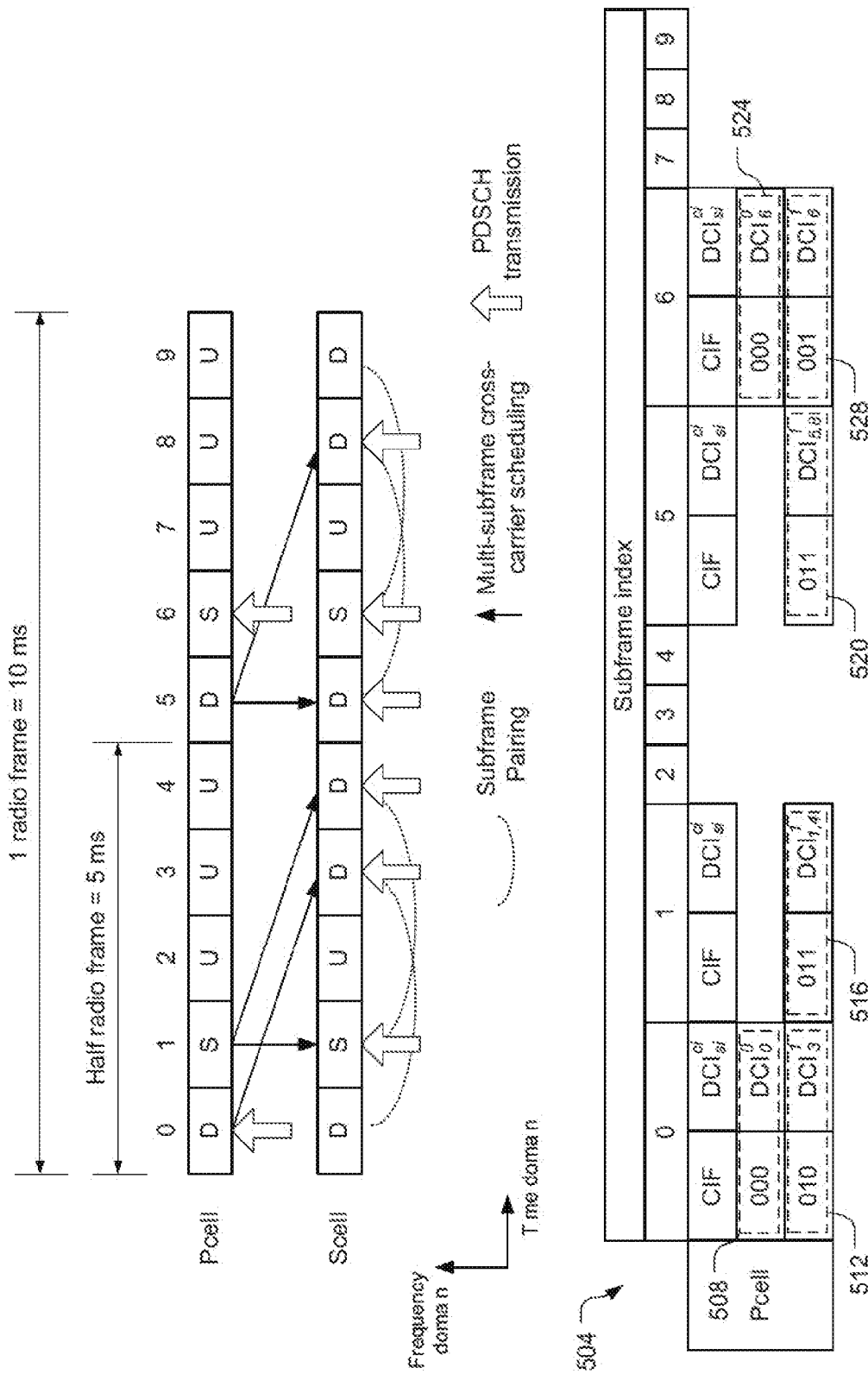
FIG. 5 illustrates an MSCC scheduling of a radio frame in accordance with various embodiments.

FIG. 5 illustrates an MSCC scheduling of a radio frame in which a Pcell and an Scell are configured for communication in accordance with some embodiments. The radio frame is a 10 ms radio frame with PDSCH transmissions on subframes 0 and 6 of the Pcell and subframes 1, 3, 4, 5, 6, and 8 of the Scell.

Chart 504 illustrates specific DCI that include CIF values and associated indicators. The MSCC scheduling reflected in the embodiment of FIG. 5 may be based on table 300.

Subframe 0 of the Pcell may include, e.g., in a PDCCH transmission, DCI 508 and 512. Each DCI may include a CIF value and an associated indicator. The indicator is shown as $DCI_{si}^{ci}$, where ci is the carrier index, either 0 or 1, and si is the subframe index.

DCI 508 may include a CIF value of 000 and an indicator $DCI_0^0$. By reference to table 300, the indicator may identify a downlink resource of a PDSCH transmission in subframe 0 of the Pcell, i.e., carrier 0, that is to include data directed to the UE 108.

DCI 512 may include a CIF value of 010 and an indicator $DCI_3^1$. The indicator may identify a downlink resource of a PDSCH transmission in subframe 3 of the Scell, i.e., carrier 1, that is to include data directed to the UE 108.

Subframe 1 of the Pcell may include DCI 516. DCI 516 may include a CIF value of 011 and an indicator $DCI_{1,4}^1$. The indicator of DCI 516 may identify a downlink resource of a PDSCH transmission in subframes 1 and 5 of the Scell. In this embodiment, the identified resource may be in the same position in both subframes.

Subframe 5 of the Pcell may include DCI 520. DCI 520 may include a CIF value of 011 and an indicator $DCI_{5,8}^1$. The indicator of DCI 520 may identify a downlink resource of a PDSCH transmission in subframes 5 and 8 of the Scell.

Subframe 6 of the Pcell may include DCIs 524 and 528. DCI 524 may include a CIF value of 000 and an indicator $DCI_6^0$ to identify a downlink resource of a PDSCH transmission in subframe 6 of the Pcell. DCI 528 may include a CIF value of 001 and an indicator $DCI_6^1$ to identify a downlink resource of a PDSCH transmission in subframe 6 of the Scell.

Figure 6:
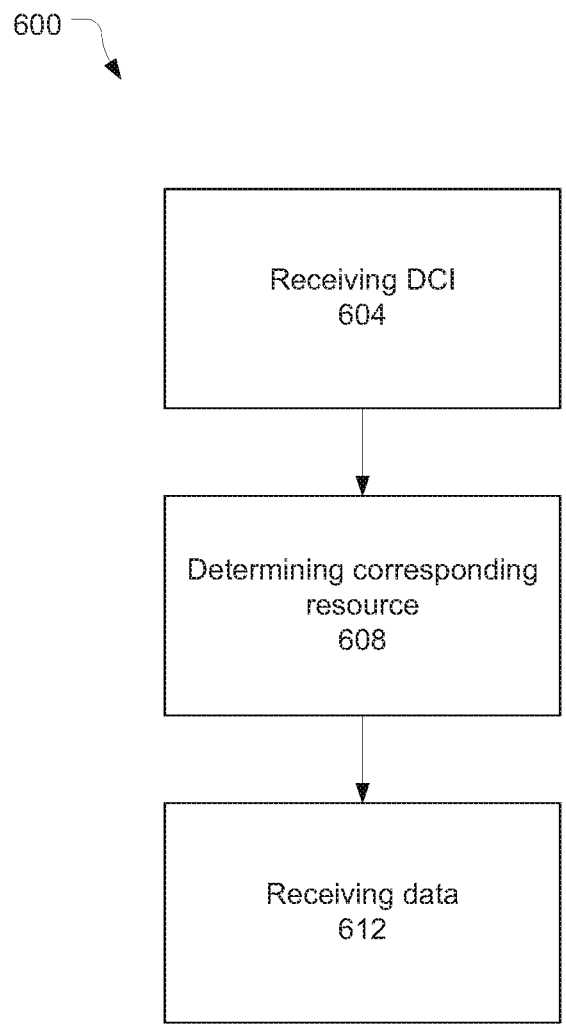
FIG. 6 is a flowchart illustrating an operation of a user equipment in accordance with various embodiments.

FIG. 6 is a flowchart illustrating an operation 600 of a user equipment, e.g., UE 108, in accordance with some embodiments.

At block 604, the operation may include receiving downlink control information. The DCI may be received by a decoder module, e.g., decoder module 124, decoding resources within a PDCCH of a Pcell. In some embodiments, the decoder may blindly decode blocks within a particular search space to receive the DCI. Upon receipt of the DCI, the decoder module may then provide the DCI to a scheduling module, e.g., scheduling module 128.

At block 608, the operation 600 may include determining corresponding resource. In some embodiments, the determining may be performed by the scheduling module accessing a table and identifying a value within the table based on a CIF value of the DCI. The scheduling module may then identify a resource within a PDSCH that is to include data directed to the UE, based on the value from the table. This identification may be performed as described above. The scheduling module may communicate the identified resource to the decoding module.

At block 612, the operation 600 may include receiving data. The receipt of the data may be performed by the decoder module decoding the resource of the PDSCH transmission identified by the scheduling module in block 608.

Figure 7:
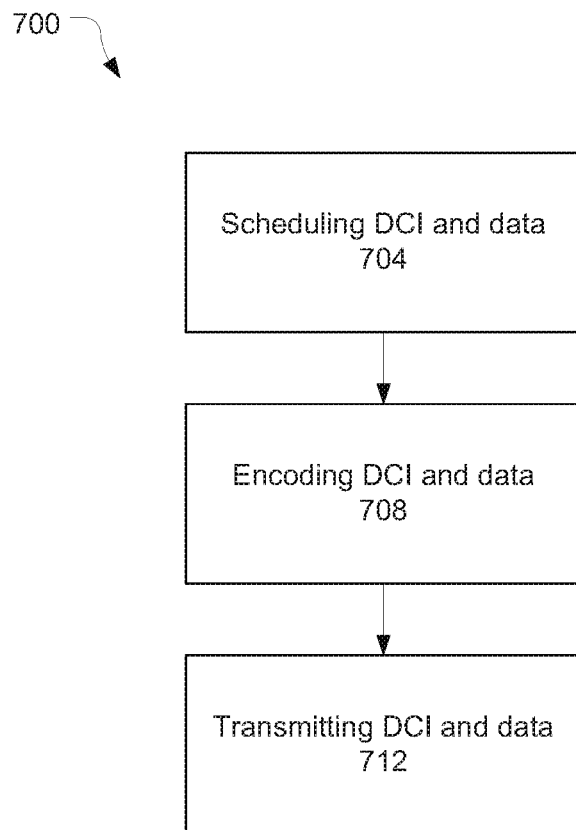
FIG. 7 is a flowchart illustrating an operation of a base station in accordance with various embodiments.

FIG. 7 is a flowchart illustrating an operation 700 of a base station, e.g., eNB 104, in accordance with some embodiments.

At block 704, the operation 700 may include scheduling DCI and data. The scheduling may be done by a scheduling module, e.g., scheduling module 140, scheduling the DCI in a PDCCH of a first subframe of a Pcell and the data into a PDSCH of a second subframe of the Scell. The DCI may identify the downlink resource carrying the data in the PDSCH of the second subframe of the Scell.

At block 708, the operation 700 may include encoding DCI and data. The DCI and data may be encoded by an encoder module, e.g., encoder module 144, encoding the DCI in the PDCCH of the first subframe of a Pcell and the data in the PDSCH of the second subframe of the Scell. The DCI may be encoded as a 3-bit CIF value.

At block 712, the operation 700 may include transmitting the DCI and the data. The DCI and the data may be transmitted by a transmitter module, e.g., transmitter module 148.

Figure 8:
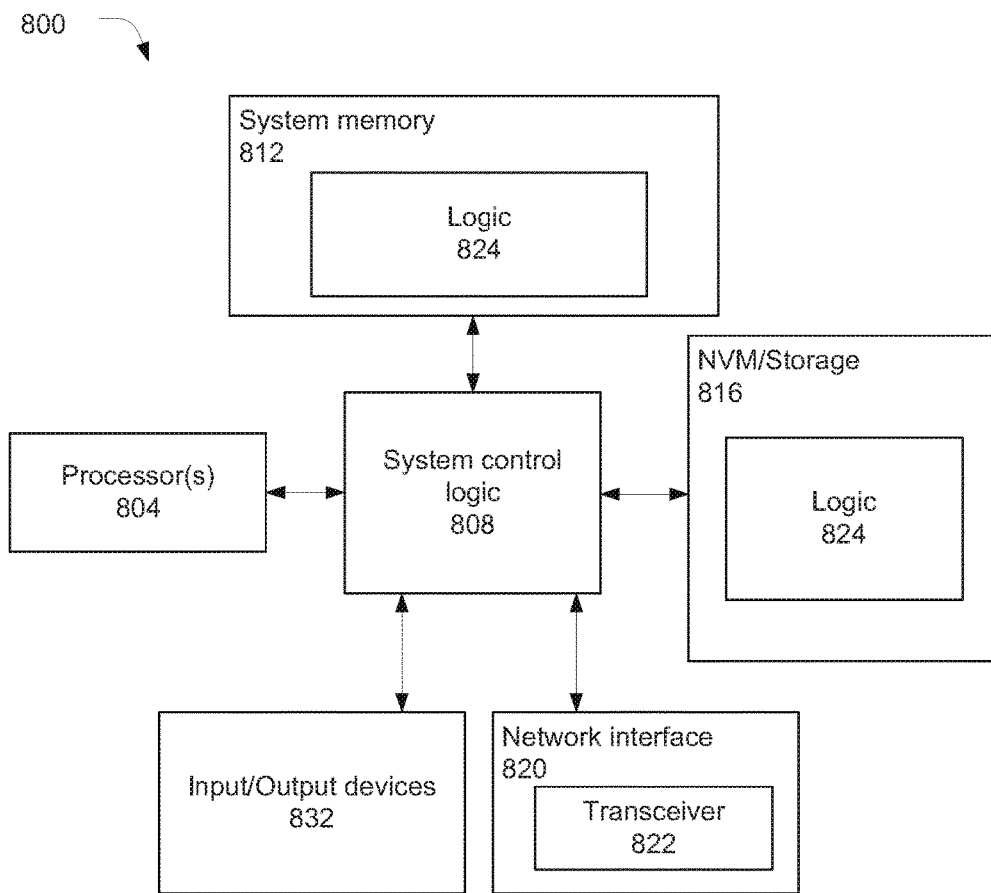
FIG. 8 schematically depicts an example system in accordance with various embodiments.

The modules described herein may be implemented into a system using any suitable hardware and/or software to configure as desired. FIG. 8 illustrates, for one embodiment, an example system 800 comprising one or more processor(s) 804, system control logic 808 coupled with at least one of the processor(s) 804, system memory 812 coupled with system control logic 808, non-volatile memory (NVM)/storage 816 coupled with system control logic 808, and a network interface 820 coupled with system control logic 808.

The processor(s) 804 may include one or more single-core or multi-core processors. The processor(s) 804 may include any combination of general-purpose processors and dedicated processors (e.g., graphics processors, application processors, baseband processors, etc.).

System control logic 808 for one embodiment may include any suitable interface controllers to provide for any suitable interface to at least one of the processor(s) 804 and/or to any suitable device or component in communication with system control logic 808.

System control logic 808 for one embodiment may include one or more memory controller(s) to provide an interface to system memory 812. System memory 812 may be used to load and store data and/or instructions, for example, for system 800. System memory 812 for one embodiment may include any suitable volatile memory, such as suitable dynamic random access memory (DRAM), for example.

NVM/storage 816 may include one or more tangible, non-transitory computer-readable media used to store data and/or instructions, for example. NVM/storage 816 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 816 may include a storage resource physically part of a device on which the system 800 is installed or it may be accessible by, but not necessarily a part of, the device. For example, the NVM/storage 816 may be accessed over a network via the network interface 820.

System memory 812 and NVM/storage 816 may respectively include, in particular, temporal and persistent copies of logic 824. The logic 824 may include instructions that when executed by at least one of the processor(s) 804 result in the system 800 implementing one or modules, e.g., decoder module 124, scheduling module 128, scheduling module 140, and/or encoder module 144, to perform corresponding operations described herein. In some embodiments, the logic 824, or hardware, firmware, and/or software components thereof, may additionally/alternatively be located in the system control logic 808, the network interface 820, and/or the processor(s) 804.

System memory 812 and NVM/storage 816 may also include data that may be operated on, or otherwise used in conjunction with, the implemented modules. For example, one or more MSCC tables may be stored in system memory 812 and/or NVM/storage 816 and accessible by the modules for implementing MSCC scheduling operations described herein.

Network interface 820 may have a transceiver 822 to provide a radio interface for system 800 to communicate over one or more network(s) and/or with any other suitable device. The transceiver 822 may implement receiver module 120 and/or transmitter module 132. In various embodiments, the transceiver 822 may be integrated with other components of system 800. For example, the transceiver 822 may include a processor of the processor(s) 804, memory of the system memory 812, and NVM/Storage of NVM/Storage 816. Network interface 820 may include any suitable hardware and/or firmware. Network interface 820 may include a plurality of antennas to provide a multiple input, multiple output radio interface. Network interface 820 for one embodiment may include, for example, a network adapter, a wireless network adapter, a telephone modem, and/or a wireless modem.

For one embodiment, at least one of the processor(s) 804 may be packaged together with logic for one or more controller(s) of system control logic 808. For one embodiment, at least one of the processor(s) 804 may be packaged together with logic for one or more controllers of system control logic 808 to form a System in Package (SiP). For one embodiment, at least one of the processor(s) 804 may be integrated on the same die with logic for one or more controller(s) of system control logic 808. For one embodiment, at least one of the processor(s) 804 may be integrated on the same die with logic for one or more controller(s) of system control logic 808 to form a System on Chip (SoC).

The system 800 may further include input/output (I/O) devices 832. The I/O devices 832 may include user interfaces designed to enable user interaction with the system 800, peripheral component interfaces designed to enable peripheral component interaction with the system 800, and/or sensors designed to determine environmental conditions and/or location information related to the system 800.

In various embodiments, the user interfaces could include, but are not limited to, a display (e.g., a liquid crystal display, a touch screen display, etc.), a speaker, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 820 to communicate with components of a positioning network, e.g., a global positioning system (GPS) satellite.

In various embodiments, the system 800 may be a mobile computing device such as, but not limited to, a laptop computing device, a tablet computing device, a netbook, an ultrabook, a smartphone, etc. In various embodiments, system 800 may have more or less components, and/or different architectures.

In various embodiments, an apparatus, e.g., a UE, is described including a scheduling module configured to: receive, from a base station, DCI in a first subframe of a Pcell of the base station, the DCI to include a CIF value and an indicator to indicate a downlink resource of a PDSCH transmission that is to include data directed to the apparatus; and determine, based on a predetermined subframe pairing and the CIF value, that the PDSCH transmission is in a second subframe of an Scell. The apparatus may further include a decoder module configured to decode the downlink resource of the PDSCH transmission based on the indicator and said determination that the PDSCH transmission is in the second subframe of the Scell. The downlink resource may be a physical resource block in some embodiments.

In some embodiments, the predetermined subframe pairing may be a pairing between two subframes in each half-radio frame. For example, the pairing may be a pairing of subframe 0 and 3 or of subframe 1 and 4.

In some embodiments, the scheduling module is further configured to access mapping information based on the CIF value and a carrier aggregation level; and determine, based on the mapping information, the indicator applies to a first paired subframe of the predetermined subframe pairing, a second paired subframe of the predetermined subframe pairing, or to both the first and second paired subframe of the predetermined subframe pairing. The mapping information may be stored in an MSCC table that provides mapping information for individual combinations of CIF values and carrier aggregation levels.

In some embodiments, the CIF value may be a 3-bit value having eight states; the carrier aggregation level may be two, three, four, or five; and the mapping information may identify the Pcell if the CIF value is a first state and the CA level is two, three, four or five; the first paired subframe of a first Scell if the CIF value is a second state and the CA level is two, three, four, or five; the second paired subframe of the first Scell if the CIF value is a third state and the CA level is two, three, four, or five; the first and second paired subframes of the first Scell if the CIF value is a fourth state and the CA level is two or three; the first paired subframe of a second Scell if the CIF value is the fourth state and the CA level is four or five; the first paired subframe of the second Scell if the CIF value is a fifth state and the CA level is three; the second paired subframe of the second Scell if the CIF value is the fifth state and the CA level is four or five; the second paired subframe of the second Scell if the CIF value is a sixth state and the CA level is three; the first paired subframe of a third Scell if the CIF value is the sixth state and the CA level is four or five; the first and second paired subframes of the second Scell if the CIF value is a seventh state and the CA level is three; the second paired subframe of the third Scell if the CIF value is the seventh state and the CA level is four or five; and the first paired subframe of a fourth Scell if the CIF value is an eighth state and the CA level is five.

In some embodiments, the CIF value may be a 3-bit value having eight states; the carrier aggregation level may be two, three, four, or five; and the mapping information may identify: the primary serving cell if the CIF value is a first state and the CA level is two, three, four or five; the first paired subframe of a first Scell if the CIF value is a second state and the CA level is two, three, four, or five; the second paired subframe of the first Scell if the CIF value is a third state and the CA level is two, three, four, or five; the first and second paired subframes of the first Scell if the CIF value is a fourth state and the CA level is two, three, four, or five; the first paired subframe of a second Scell if the CIF value is a fifth state and the CA level is three, four, or five; the second paired subframe of the second Scell if the CIF value is a sixth state and the CA level is three, four, or five; the first and second paired subframes of the second Scell if the CIF value is the seventh state and the CA level is three; the first paired subframe of a third Scell if the CIF value is the seventh state and the CA level is four or five; the second paired subframe of the third Scell if the CIF value is an eighth state and the CA level is four; and the first paired subframe of the fourth Scell if the CIF value is the eighth state and the CA level is five.

In some embodiments, the CIF value may be a 3-bit value having eight states; the carrier aggregation level may be two, three, four, or five; the Scell may be a first Scell; and the mapping information may identify: the primary serving cell if the CIF value is a first state and the CA level is two, three, four or five; the first paired subframe of a first Scell if the CIF value is a second state and the CA level is two, three, four, or five; the second paired subframe of the first Scell if the CIF value is a third state and the CA level is two, three, four, or five; the first and second paired subframes of the first Scell if the CIF value is a fourth state and the CA level is two, three, four, or five; the first paired subframe of a second Scell if the CIF value is a fifth state and the CA level is three, four, or five; the second paired subframe of the second Scell if the CIF value is a sixth state and the CA level is three, four, or five; the first and second paired subframes of the second Scell if the CIF value is the seventh state and the CA level is three; the first and second paired subframes of the second Scell if the CIF value is the seventh state and the CA level is four; the first paired subframe of a third Scell if the CIF value is the seventh state and the CA level is five; the first paired subframe of the third Scell if the CIF value is an eighth state and the CA level is four; and the first paired subframe of the fourth Scell if the CIF value is the eighth state and the CA level is five.

In some embodiments, the scheduling module may be configured to determine that the PDSCH transmission is in the second subframe of the secondary serving cell based further on a predetermined subframe pairing of the first subframe and the second subframe.

In some embodiments, the Pcell and the Scell may include respective component carriers having different TDD configurations.

In some embodiments, a plurality of component carriers are aggregated for communication between the apparatus and the base station and the scheduling module is further configured to determine that the PDSCH transmission is in the second subframe of the secondary serving cell based further on a number of the plurality of component carriers.

In some embodiments, the Pcell utilizes a first common carrier and the Scell utilizes a second common carrier.

In some embodiments, the scheduling module may be further configured to access mapping information in an MSCC table based on the CIF value and a carrier aggregation level; determine that the PDSCH transmission is in the second subframe based on the mapping information; and determine, based on the mapping information, that another PDSCH transmission of a third subframe of the secondary serving cell is also to include data directed to the apparatus.

In other embodiments, an apparatus, e.g., an eNB, is described to include a scheduling module configured to: schedule DCI in a PDCCH of a first subframe of a first component carrier of a plurality of component carriers aggregated for communication between a user equipment and a base station; and schedule data for the user equipment in a PDSCH of a second subframe of a second component carrier of the plurality of component carriers, wherein the DCI is configured to identify the second subframe of the second component carrier and the second subframe occurs later in a frame sequence then the first subframe; and an encoder module configured to encode the DCI in the PDCCH and the data in the PDSCH.

In some embodiments, the transmitter module may be configured to transmit the DCI in the PDCCH and the data in the PDSCH.

In some embodiments, the encoder module may be configured to encode the DCI to include a CIF value, e.g., with 3-bits, to identify the second subframe and the second component carrier.

In some embodiments, a method is described to include identifying a downlink resource, in a first subframe of a first component carrier of a plurality of component carriers, that is to include data directed to a user equipment based on DCI received in a second subframe of a second component carrier of the plurality of component carriers, wherein the second subframe occurs earlier in a frame sequence than the first subframe; and decoding the downlink resource to receive data directed to the user equipment.

In some embodiments, the method may include accessing an MSCC table to retrieve mapping information based on a CIF value in the DCI and a carrier aggregation level; and identifying the downlink resource based on the mapping information.

In some embodiments, one or more computer-readable media having instructions that, if executed by one or more processors, cause an apparatus to perform various methods described herein.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. An apparatus comprising:
scheduling circuitry to:
receive, from an eNB, downlink control information (DCI) in a first subframe of a primary serving cell (Pcell) of the eNB, the DCI to include a carrier indication field (CIF) value;
access mapping information, based on the CIF value and a carrier aggregation level; and
determine, based on the mapping information, that the DCI pertains to a second subframe of a secondary serving cell (Scell), wherein the second subframe occurs later in a frame sequence than the first subframe; and
decoder circuitry coupled with the scheduling circuitry to decode a downlink resource of a physical downlink shared channel (PDSCH) transmission in the second subframe of the Scell based on said determination that the DCI pertains to the second subframe,
wherein:
the mapping information includes a subframe pairing index that corresponds to a predetermined subframe pairing of subframes 0 and 3 or of subframes 1 and 4; and
the scheduling circuitry is to determine that the DCI pertains to the second subframe based on the subframe pairing index.

2. The apparatus of claim 1, wherein the subframe pairing index is a first subframe pairing index and the mapping information further includes a second subframe pairing index that corresponds to the predetermined subframe pairing and the scheduling circuitry is to further determine that the DCI further pertains to a first subframe of the Scell, the first subframe of the Scell occurring at a same time as the first subframe of the Pcell in the frame sequence.

3. The apparatus of claim 1, wherein the predetermined subframe pairing is a pairing between two subframes in each half-radio frame.

4. The apparatus of claim 1, wherein the mapping information is stored in a multi-subframe cross-carrier (MSCC) table that provides mapping information for individual combinations of CIF values and carrier aggregation levels.

5. The apparatus of claim 1, wherein the Pcell and the Scell include respective component carriers having different time-division duplexing (TDD) configurations.

6. The apparatus of claim 1, wherein a plurality of component carriers are aggregated for communication and the scheduling circuitry is further to:
determine that the PDSCH transmission is in the second subframe of the secondary serving cell based further on a number of the plurality of component carriers.

7. The apparatus of claim 1, wherein the eNB is a first eNB and the Scell is provided by a second eNB.

8. An apparatus comprising:
scheduling circuitry to:
schedule downlink control information (DCI) in a physical downlink control channel (PDCCH) of a first subframe of a first component carrier of a plurality of component carriers aggregated for communication with a user equipment;
schedule data for the user equipment in a physical downlink shared channel (PDSCH) of a second subframe of a second component carrier of the plurality of component carriers, wherein the DCI is configured to identify the second subframe of the second component carrier and the second subframe occurs later in a frame sequence than the first subframe; and
access mapping information based on a number of the plurality of component carriers and the second subframe of the second component carrier to identify a CIF value that may be used, along with the number of the plurality of component carriers, to provide an indication that the DCI pertains to the second subframe of the second component carrier; and
encoder circuitry to encode the DCI with the CIF value in the PDCCH and the data in the PDSCH,
wherein:
the mapping information includes a subframe pairing index that corresponds to a predetermined subframe pairing of subframes 0 and 3 or of subframes 1 and 4; and
the scheduling circuitry is to identify the CIF value based on the subframe pairing index.

9. The apparatus of claim 8, wherein the predetermined subframe pairing is a pairing between two subframes in each half-radio frame.

10. The apparatus of claim 8, further comprising:
a transmitter module configured to transmit the DCI in the PDCCH and the data in the PDSCH.

11. The apparatus of claim 8, wherein the CIF value is encoded with 3-bits.

12. The apparatus of claim 8, wherein the first component carrier is associated with a primary serving cell and the second component carrier is associated with a secondary serving cell.

13. The apparatus of claim 8, further comprising an enhanced node eNB (eNB).

14. One or more non-transitory, computer-readable media having instructions that, when executed, cause an apparatus to:
access downlink control information (DCI) received from an eNB in a first subframe of a primary serving cell (Pcell), the DCI to include a carrier indication field (CIF) value;
access mapping information, based on the CIF value and a carrier aggregation level;
determine, based on the mapping information, that the DCI pertains to a second subframe of a secondary serving cell (Scell), wherein the second subframe occurs later in a frame sequence than the first subframe; and
decode a downlink resource of a physical downlink shared channel (PDSCH) transmission in the second subframe of the Scell based on said determination that the DCI pertains to the second subframe
wherein:
the mapping information includes a subframe pairing index that corresponds to a predetermined subframe pairing of subframes 0 and 3 or of subframes 1 and 4; and
the apparatus is to determine that the DCI pertains to the second subframe based on the subframe pairing index.

15. The one or more non-transitory, computer-readable media of claim 14, wherein the subframe pairing index is a first subframe pairing index and the mapping information further includes a second subframe pairing index that corresponds to the predetermined subframe pairing and the scheduling circuitry is to further determine that the DCI further pertains to a first subframe of the Scell, the first subframe of the Scell occurring at a same time as the first subframe of the Pcell in the frame sequence.

16. The one or more non-transitory, computer-readable media of claim 14, wherein the predetermined subframe pairing is a pairing between two subframes in each half-radio frame.

* * * * *